(12) United States Patent
Melde-Tuczai et al.

(10) Patent No.: US 9,670,952 B2
(45) Date of Patent: Jun. 6, 2017

(54) LENGTH-ADJUSTABLE CON ROD

(71) Applicant: AVL LIST GMBH, Graz (AT)

(72) Inventors: Helmut Melde-Tuczai, Graz (AT); Bernhard Hoedl, Graz (AT); Andreas Zurk, Weinburg (AT); Wolfgang Schoeffmann, St. Veit/Glan (AT)

(73) Assignee: AVL List GmbH, Graz (AT)

( * ) Notice: Subject to any disclaimer, the term of this patent is extended or adjusted under 35 U.S.C. 154(b) by 0 days.

(21) Appl. No.: 14/412,310

(22) PCT Filed: Jul. 1, 2013

(86) PCT No.: PCT/EP2013/063812
§ 371 (c)(1),
(2) Date: Dec. 31, 2014

(87) PCT Pub. No.: WO2014/005984
PCT Pub. Date: Jan. 9, 2014

(65) Prior Publication Data
US 2015/0122077 A1    May 7, 2015

(30) Foreign Application Priority Data

Jul. 3, 2012  (AT) .............................. A 50262/2012
Apr. 2, 2013  (AT) .............................. A 50220/2013

(51) Int. Cl.
*F02B 75/04*    (2006.01)
*F16C 7/06*    (2006.01)

(52) U.S. Cl.
CPC .............. *F16C 7/06* (2013.01); *F02B 75/045* (2013.01); *Y10T 74/2151* (2015.01)

(58) Field of Classification Search
CPC ....... F16C 7/06; F02B 75/045; Y10T 74/2151
(Continued)

(56) References Cited

U.S. PATENT DOCUMENTS 1,610,137 A * 12/1926 Kratsch ..................... F16C 7/04
                                                          123/78 E
2,134,995 A    11/1938 Anderson
(Continued)

FOREIGN PATENT DOCUMENTS

CN    101109321    1/2008
DE    19835146    6/1999
(Continued)

OTHER PUBLICATIONS

English Abstract of CN 101109321.
(Continued)

*Primary Examiner* — Marguerite McMahon
(74) *Attorney, Agent, or Firm* — Dykema Gossett PLLC

(57) ABSTRACT

The invention relates to a length-adjustable con rod (1) for a reciprocating piston engine, particularly an internal combustion engine, having at least a first and a second rod part (2, 4), wherein the two rod parts (2, 4) can be pushed together and/or inside one another in a telescoping manner, wherein the second rod part (4) forms a guide cylinder (4a) and the first rod part (2) a piston element (3) which can be pushed longitudinally in the guide cylinder (4a), wherein a high-pressure chamber (4b), into which at least one oil channel (10) opens, is clamped between the first and the second rod parts (2, 4). To enable the compression ratio to be adjusted in the simplest and most reliable manner possible, according to the invention the two rod parts (2, 4) can be fixed, by a locking device (32), relative to one another in at least one position, preferably corresponding to a minimum length of the con rod (1).

48 Claims, 4 Drawing Sheets

(58) Field of Classification Search
USPC .................................. 123/78 E, 48 B, 197.3
See application file for complete search history.

(56) References Cited

U.S. PATENT DOCUMENTS

| | | | | |
|---|---|---|---|---|
| 2,252,153 | A | * | 8/1941 | Anthony ................. F16C 7/023 |
| | | | | 123/197.3 |
| 4,124,002 | A | | 11/1978 | Crise |
| 4,140,091 | A | | 2/1979 | Showers |
| 4,195,601 | A | | 4/1980 | Crise |
| 4,370,901 | A | | 2/1983 | Bolen |
| 5,724,863 | A | * | 3/1998 | Kramer ................... F02B 41/04 |
| | | | | 123/48 R |
| 6,568,357 | B1 | | 5/2003 | Rao et al. |
| 6,604,496 | B2 | | 8/2003 | Bartsch et al. |
| 2002/0129778 | A1 | * | 9/2002 | Bartsch ................ F02B 75/045 |
| | | | | 123/78 E |

FOREIGN PATENT DOCUMENTS

| | | |
|---|---|---|
| DE | 10151516 | 5/2002 |
| FR | 2857408 | 1/2005 |
| WO | 0210568 | 2/2002 |

OTHER PUBLICATIONS

English Abstract of DE 19835146.
English Abstract of DE 10151516.
English Abstract of FR 2857408.

* cited by examiner

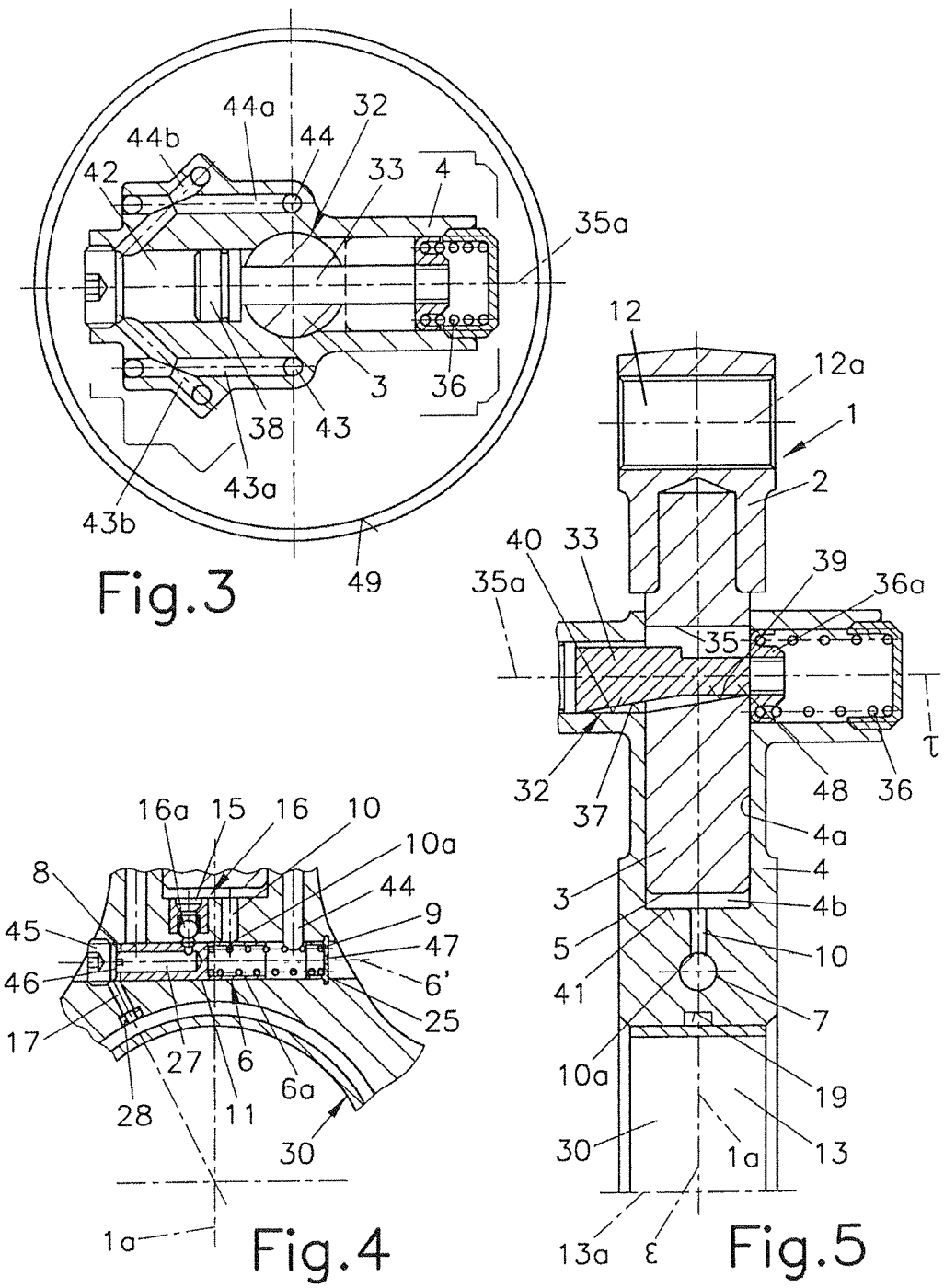

LENGTH-ADJUSTABLE CON ROD

BACKGROUND OF THE INVENTION

Field of the Invention

The invention relates to a length-adjustable connecting rod for a reciprocating piston engine, especially an internal combustion engine, comprising at least a first and a second rod part, which two rod parts can be pushed together and/or inside one another in a telescopic manner, wherein the second rod part forms a guide cylinder and the first rod part a piston element which is longitudinally displaceable in the guide cylinder, wherein a high-pressure chamber is spanned between the first and the second rod part, into which at least one first oil duct opens.

The Prior Art

DE 101 51 517 A1 describes a piston and connecting rod assembly of variable length for producing a variable compression ratio in an internal combustion engine, comprising a first part and a second part which are coupled to a length-changing mechanism which is accommodated between the parts. The length-changing mechanism comprises a spring washer shaped in the manner of a truncated cone and an elastomeric mass which rests on a concave surface of the spring washer.

Further connecting rods with a respective hydraulic telescopic mechanism for adjusting the connecting rod length are known from the specifications FR 2 857 408 A1, EP 1 243 773 A1, WO 02/10568 A1, DE 198 35 146 A1, U.S. Pat. No. 4,370,901 A, U.S. Pat. No. 4,195,601 A, U.S. Pat. No. 4,124,002 A and U.S. Pat. No. 2,134,995 A.

By changing the compression, full load can be operated at a lower compression ratio, and partial load and starting at an increased ratio. Consumption is improved in the part-load range, the compression pressure with increased compression ratio is increased during starting, and the peak pressure at reduced ratio is reduced under high load, and knocking is prevented.

It is known to use an eccentric piston pin or an eccentric crankpin fillet of the crankshaft for adjusting the compression ratio. It is further known for changing the compression ratio to lift the entire cylinder block or to lower the entire crankshaft bearing with eccentric bearing thereof in the crankcase.

All these proposals require high constructional and controlling efforts.

It is the object of the invention to avoid these disadvantages and to provide a simple and reliable solution for changing the compression ratio.

SUMMARY OF THE INVENTION

This is achieved in accordance with the invention in such a way that the two rod parts can be fixed by a locking device relative to one another in at least one position, preferably corresponding to a minimum length of the connecting rod.

The variable compression is achieved in that the rod length increases in length under low load and decreases under higher load. This leads to higher or lower compression ratios depending on the load. The effect is that the higher compression ratio allows the efficiency to increase under low load and the peak pressure is not excessively high at higher load. The adjustment occurs by way of the oil pressure in the internal combustion engine.

The piston element can be lifted from its bottom position in the high-load phase, which can lead to negative pressure and thus cavitation phenomena in the high-pressure chamber.

In order to prevent cavitation phenomena, the two rod parts are fixed relative to each other by the locking device in a position corresponding to the minimum length of the connecting rod. It is especially advantageous if the locking device comprises a movable stop element which is displaceably arranged transversely to the connecting rod axis in a transverse borehole of the piston element preferably against the force of a restoring spring. The stop element can comprise at least one wedge surface which is inclined relative to a normal plane on the connecting rod axis, which wedge surface cooperates with a counter surface of the piston element which is preferably arranged in parallel to the wedge surface, wherein preferably the wedge surface faces the high-pressure chamber.

It is advantageous for actuating the stop element if the stop element comprises a stop piston which is displaceably mounted in a cylinder or is connected thereto, wherein a pressure chamber is formed between the stop piston and the stop cylinder, which pressure chamber can be supplied with oil by at least one filling borehole.

It is provided in a preferred embodiment of the invention that the wedge surface is arranged in a divided manner and comprises two parallel partial wedge surfaces which are situated adjacent to one another in the direction of the axis of the transverse borehole, wherein a shoulder is formed between the two partial wedge surfaces. The piston element rests in the unlocked position with its counter surface on the second partial wedge surface which is parallel to the first partial wedge surface, as a result of which surface pressure by the inertial force can be kept relatively low.

In order to save space and to arrange the connecting rod as compact as possible, it is especially advantageous if the axial extension of the wedge surface or at least a partial wedge surface and/or the counter surface is lower (preferably by at least one quarter, especially preferably by at least one third) than the thickness of the piston element, which are both measured in the direction of the axis of the transverse borehole. This allows keeping the dimensions of the restoring spring and the piston travel of the stop piston very low, so that a respective safety distance from the surrounding cylinder surface can be maintained.

Furthermore, the pressure chamber can be connected to at least one discharge borehole.

In one variant of the invention, the axis of the transverse borehole is arranged normally to an oscillating plane of the connecting rod arranged normally to the connecting-rod eye axes, preferably normally to the longitudinal axis of the connecting rod. This allows large free space to the surrounding cylinder in the oscillating plane.

If there is little free space normally to the oscillating plane, i.e. in the direction of the connecting rod eyes, e.g. as a result of the rotating crank webs of the crankshaft, it can be advantageous to arrange the axis of the transverse borehole in the oscillating plane of the connecting rod, preferably normally to the longitudinal axis of the connecting rod.

The transverse borehole is advantageously arranged in the upper third of the connecting rod which comprises the small-end of the connecting rod. This leads to especially small deflections of the stop element.

In order to enable simple control of the changes in the compression ratio, at least one valve, preferably a control valve, is arranged in the first oil duct, which valve preferably has a first position and a second position, wherein the first oil duct is closed in the first position and the first oil duct is open in the second position.

It is provided in a simple embodiment of the invention that the valve is arranged as a ball valve with a valve ball and a piston pin which is axially displaceable in a receiving borehole and which is displaceable together with the valve ball by a restoring spring to a first position and by oil pressure against the force of the restoring spring to a second position.

It can alternatively also be provided that the valve is arranged as a control valve with an actuating piston which is axially displaceable in a receiving borehole and which is displaceable by a restoring spring to a first position and by oil pressure against the force of the restoring spring to a second position, wherein preferably the first oil duct is closed in the first position and open in the second position.

A simple control is achieved if the first oil duct is arranged as a feed and discharge duct, wherein preferably a second oil duct arranged as a feed duct opens into the high-pressure chamber, in which a non-return valve opening in the direction of the high-pressure chamber is arranged.

An oil supply duct which is preferably flow-connected to the connecting-rod bearing opens into the receiving borehole, wherein a throttling point is arranged in an especially preferred manner in the oil supply duct. As a result, a negative pressure wave which is produced during the intake by the inertial force of the first rod part can be weakened with respect to the oil in the connecting-rod bearing. The second oil feed duct can originate from the receiving borehole of the control valve or from the oil supply duct.

It is provided in an embodiment of the invention which is simple to produce from a production standpoint that the receiving borehole is formed by a borehole transversely to the longitudinal axis of the connecting rod. An especially compact configuration can be achieved when the valve is arranged in the region of a connecting-rod big-end of the connecting rod.

Simple control of the stop element is achieved when the filling borehole can be controlled by the actuating piston of the control valve, wherein the filling borehole is activated in the second position of the actuating piston and closed in the first position of the actuating piston.

It is especially advantageous if the discharge borehole through the actuating piston of the control valve is controllable, wherein the discharge borehole is activated in the first position of the actuating piston and closed in the second position of the actuating piston.

BRIEF DESCRIPTION OF THE DRAWINGS

The invention will be explained below in greater detail by reference to the drawings, wherein:

FIG. 3 shows this connecting rod in the locked position in a sectional view along the line III-III in FIG. 1;

FIG. 4 shows the connecting rod in a sectional view analogously to FIG. 1 during a second switching position;

FIG. 5 shows a partial sectional view of the longitudinal section of the connecting rod analogously to FIG. 2 in a second switching position in the unlocked position;

DETAILED DESCRIPTION OF THE DEPICTED EMBODIMENTS

Figures 1, 2:
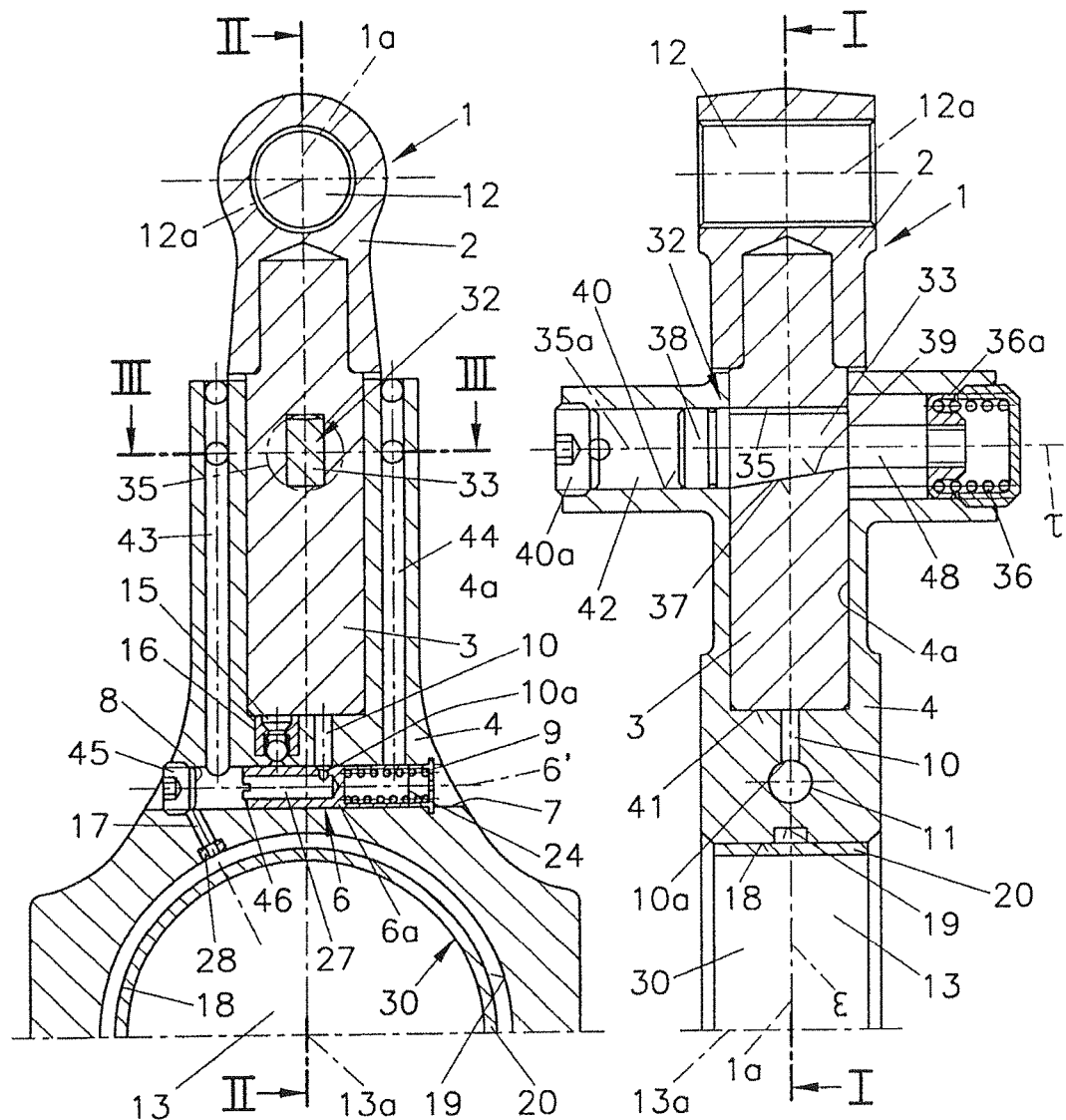
FIG. 1 shows a connecting rod in accordance with the invention in a first embodiment in a sectional view along the line I-I in FIG. 2 in a first switching position.
FIG. 2 shows this connecting rod in a sectional view along the line II-II in FIG. 1.

Functionally identical parts are provided in the embodiments with the same reference numerals.

The drawings respectively show a divided connecting rod 1 of an internal combustion engine. A cylindrical piston element 3 is pressed into the upper first rod part 2. The bottom part of said piston element 3 sits with play in a guide cylinder 4a of the bottom second rod part 4 of the connecting rod 1, wherein a high-pressure chamber 4b is spanned between the piston element 3 and the second rod part 4 in at least one position of the two rod parts 2, 4. A pressure-side bottom face end 5 of the piston element 3, which face end is adjacent to the high-pressure chamber 4b, can be supplied with motor oil. The oil supply and the discharge occur by way of a borehole which acts as the first oil duct 10. The oil supply, blockage and discharge of the oil is controlled by a control valve 6 via the oil pressure in the oil pump (not shown in closer detail) by means of a pressure control valve (also not shown in closer detail). An actuator (not shown) pre-tensions a spring in the control valve of the oil pump to a higher or lower extent. The longitudinal axis of the connecting rod 1 is designated with 1a.

Figure 10:
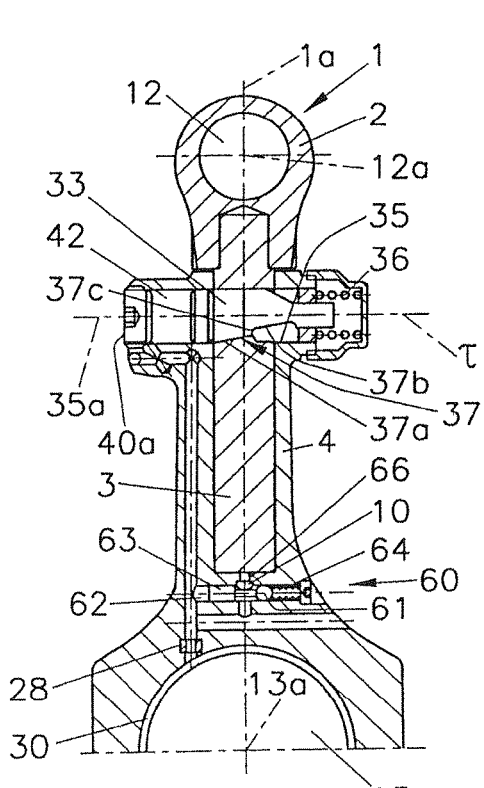
FIG. 10 shows a connecting rod in accordance with the invention in a third embodiment in a sectional view analogously to FIG. 6 in a first switching position in the locked position, and FIG. 11 this connecting rod in a second switching position in the unlocked position.
Figure 11:
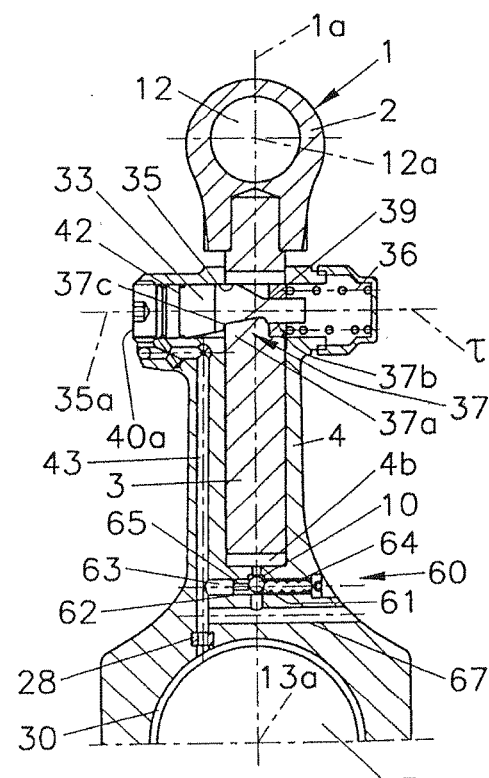

The control valve 6 can be arranged in any desired way. Two embodiments are described below in closer detail. As shown in FIG. 1 to FIG. 9, the control valve 6 can be arranged with an actuating piston 6a which is axially displaceable in a receiving borehole 7. It is also possible as an alternative thereto to arrange the control valve 6 as a ball valve 60 with a valve ball 61 and a cylinder pin 63 which is axially displaceable in a receiving borehole 62 as shown in FIG. 10 and FIG. 11 and as described below in closer detail.

FIG. 1 and FIG. 2 show the connecting rod 1 in a first embodiment in a first position associated with a low compression ratio, and FIG. 4 and FIG. 5 in a second position associated with a high compression ratio.

The actuating piston 6a in the control valve 6 according to the first embodiment is arranged with a cylinder jacket 11 with an inner borehole 27 and arranged in the receiving borehole 7 together with a restoring spring 9. The receiving borehole 7 comprises a first stop 8 and a second stop 24. The first stop 8 is formed by a locking screw 45 and at least one projection 46 on the face end of the actuating piston 6a.

The actuating piston 6a is pressed in its receiving borehole 7 formed by a borehole transversely to the longitudinal axis 1a of the connecting rod 1 by the force of the restoring spring 9 against the first stop 8 at a low oil pressure level, as is shown in FIG. 4. The phrasing "borehole transversely to the longitudinal axis" comprises both boreholes normally to the longitudinal axis 1a, and also boreholes which are inclined under a specific angle in relation to the longitudinal axis 1a. The motor oil is drawn in by the inertial force via a non-return valve 16 arranged in a second oil duct (which comprises a small ball 16a in the illustrated embodiment) beneath the face end 5 of the piston 3. The actuating piston 6a blocks the first oil duct 10 with its cylinder jacket 11, which oil duct forms a feed and discharge opening. The sucked oil cannot escape and is not compressible. As a result, the piston element 3 is lifted and the connecting rod 1 is thus longer. A higher compression ratio can thus be achieved at normal and low oil pressure.

If the control pressure of the oil pump is increased, the actuating piston 6a is pressed as shown in FIG. 1 in its receiving borehole 7 by the motor oil against the second stop 24 which is formed by the spring guide 25. The restoring spring 9 is compressed in this process. A connecting opening 10a of the first oil duct 10 for the motor oil from the connecting-rod bearing 30 to the face end 5 is opened by the actuating piston 6a. In this position, the gas pressure from the combustion chamber (not shown in closer detail) presses the piston element 3 entirely downwardly, thus obtaining a lower compression ratio. The face end 5 of the piston element 3 presses the motor oil from the high-pressure chamber 4b in this process.

It is especially advantageous that a higher compression ratio can also be set in a bottom idle range of the internal combustion engine when the motor oil pressure is lower than the control pressure, which improves consumption in the low-load range and aids cold starting. In order to maintain the high compression ratio over a prolonged period of time, the leakage losses by the play of the guide cylinder 4a from the high-pressure chamber 4b beneath the face end 5 of the piston element 3 must be refilled again in said chamber. This occurs in such a way that the inertial force draws the motor oil from the inner borehole 27 of the actuating piston 6a via the non-return valve 16 (refilling valve) into the high-pressure chamber 4b beneath the face end 5. The high pressure is built up again during the subsequent compression cycle, and the small ball 16a in the non-return valve 16 prevents the escape of the oil from the high-pressure chamber 4b. This process is repeated in each operating cycle. If it is intended to decrease the compression ratio again, the control pressure of the oil pump is increased and the actuating piston 6a is pressed by the oil pressure against the second stop 24 and the connecting opening 10a to the connecting-rod bearing 30 is thus open. The gas pressure presses the piston element 3 downwardly and the lower compression ratio is set again. The actuating piston 6a is pushed back and forth in its receiving borehole 7 by the oil pressure and the restoring spring 9 between the stops 8 at low oil pressure and 24 at high oil pressure.

The oil supply of the receiving borehole 7 of the actuating piston 6a and its inner borehole 27 occurs by way of an oil supply channel 17. It opens into a groove 19 in the base borehole 18 of the connecting-rod bearing shell 20 of the connecting-rod bearing 30. Said groove 19 in the connecting rod 1 is flow-connected to a groove in the bottom shell of the connecting-rod bearing 30 (not shown in closer detail).

In order to weaken the negative pressure wave, which is produced during intake by the inertial force, in relation to the oil in the groove 19, a throttle 28 is installed in the supply borehole 17.

In all embodiments, the two rod parts 2, 4 can be fixed by a locking device 32 in accordance with the invention in a position corresponding to the minimum length of the connecting rod 1. The locking device 32 comprises a stop element 33 with a stop piston 38 for this purpose, wherein the stop element 33 is displaceably arranged in a transverse borehole 35 of the piston element 3 against the force of a stop restoring spring 36. The stop piston 38 is displaceably mounted in a stop cylinder 40, wherein a pressure chamber 42 which can be supplied with oil by at least one filling the borehole 43, 43a, 43b with oil is arranged between the stop piston 38 and the stop cylinder. Reference numeral 40a indicates a screw plug for closing the stop cylinder 40.

The movable stop element 33 is provided on its bottom side facing the high-pressure chamber 4b with a wedge surface 37 that is inclined in relation to a normal plane τ on the longitudinal axis is of the connecting rod 1, which wedge surface has an inclination which is slightly greater than that of the self-locking. As a result of the increased oil pressure under higher load, said wedge surface 37 actively presses via the stop piston 38 that is displaceably guided in the stop cylinder 40 against the counter surface 39 of the piston element 3, which counter surface is shaped in the embodiment in a wedge-like manner according to the wedge surface 37 and faces away from the pressure chamber 42, and thus against the limit stop formed by the bottom 41 of the high-pressure chamber 4b. In this end position, the pressure chamber 42 which is formed in the embodiment by a base surface of the stop cylinder 40 and a face end of the stop piston 38 facing the same is connected by the stop piston 38 via the filling boreholes 43, 43a, 43b to the oil-conducting groove 19, 22 in the connecting-rod bearing 30. The actuating piston 6a of the control valve 6 is pressed by the oil pressure against the second stop 24 of the spring guide 25 of the restoring spring 9. The actuating piston 6a releases the filling borehole 43 and closes the discharge borehole 44 from the pressure chamber 42. Reference numeral 40a designates a screw plug.

The oil pressure is decreased in the case of a low load. In this process, the restoring spring 9 presses the actuating piston 6a to the left against the first stop 8, which is formed by the screw plug 45 and at least one projection 46 on the face end of the actuating piston 6a. In this position, it blocks the filling borehole 43 and releases the discharge borehole 44. The oil now reaches from the pressure chamber 42 via the boreholes 44, 44a and 44b and the opening 47 in the spring guide 25 (or spring disk) to the pressureless interior of the engine (not shown). In this process, the stop restoring spring 36 can expand again and pushes the movable stop element 33 in FIG. 2 to the left via the spring disk 36a until the spring disk 36a rests on the piston element 3, as shown in FIG. 5. In this position, the wedge surface 37 is pushed away from the piston element 3 and the piston element 3 is lifted by the oil which is drawn in by the inertial force until it rests on a cylindrical part 48 of the movable stop element 33. This leads to a longer connecting rod 1 and a higher compression ratio is set.

In the embodiment shown in FIG. 10 and FIG. 11, the wedge surface 37 is provided with a divided configuration and comprises two partial wedge surfaces 37a, 37b which are arranged in succession in the direction of the axis 35a of the transverse borehole 35 and parallel to the counter surface 39, wherein a shoulder 37c is formed between the two partial wedge surfaces. The shoulder 37c forms a low-tension transition between the two wedge surfaces 37a, 37b. The piston element 3 rests in FIG. 11 with its wedge surface 39 on a second partial wedge surface 37b which is adjacent to the first partial wedge surfaces 37a. As a result, excessive surface pressing by the inertial force in the unlocked position shown in FIG. 11 can be avoided. If the stop element 33 tightly holds the piston element 3 in the case of low compression, the stop element 33 pushes in the axial direction (or in the direction of the axis 35a of the transverse borehole 35) until a frictional connection is achieved between the wedge surface 37a and the piston element 3 on the one hand and the piston element 3 and the base 41 of the high-pressure chamber 4b on the other hand. In the case of high compression, the stop element 33 is pressed by the stop restoring spring 36 up against the screw plug 40a of the borehole 40, or the stop element 33 is displaced to such an extent until the spring disk 36a rests on the piston element 3. The piston element 3 is now pressed by the oil pressure against the wedge surface 37b.

If the load rises again, the pressure control valve (not shown in closer detail) of the oil circuit is adjusted via a servomotor (not shown) and the oil pressure is increased. The actuating piston 6a of the control valve 6 is thus pressed to the right again against the second stop 24. It thus releases the filling borehole 43 again and the discharge borehole 44 is closed.

The pressure rises in the pressure chamber 42 and the movable stop element 33 is displaced to the right until the wedge surface 37 presses the piston element 3 against the limit stop again that is formed by the base 41 of the high-pressure chamber 4b. The connecting rod 1 is shorter in this position and a lower compression ratio adjusted to the higher load is set.

Figure 6:
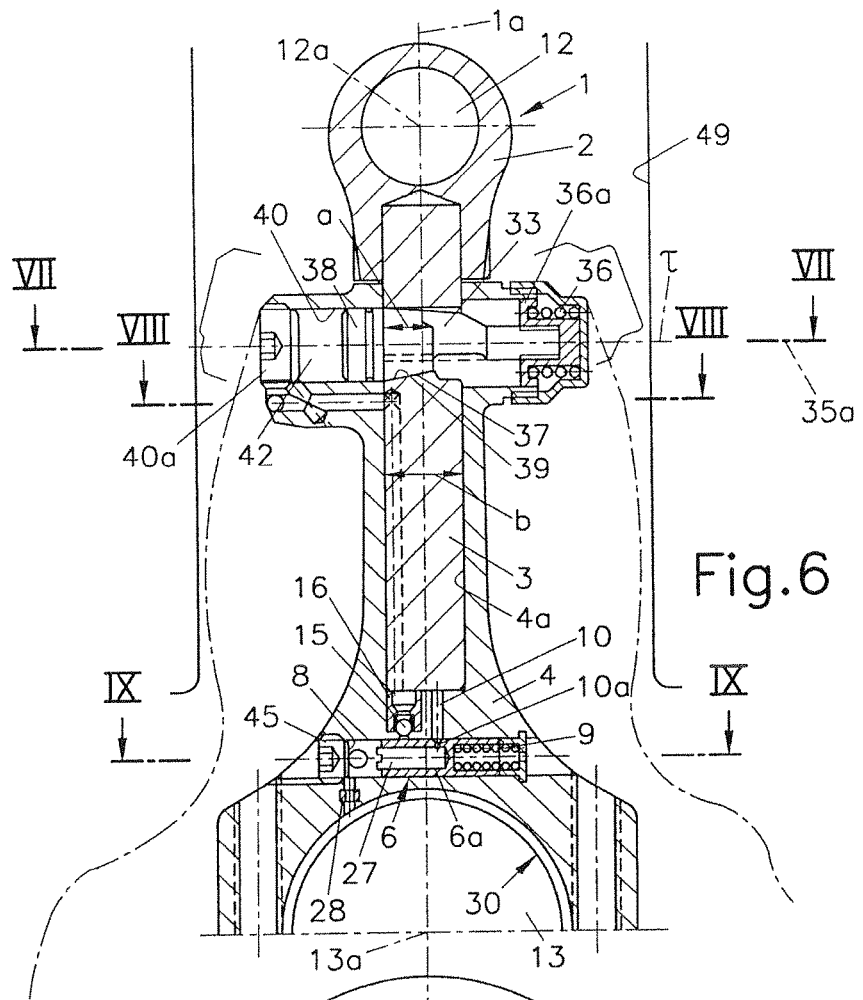
FIG. 6 shows a connecting rod in accordance with the invention in a second embodiment in a sectional view along the line VI-VI in FIG. 7 in a first switching position in the locked position.
Figure 7:
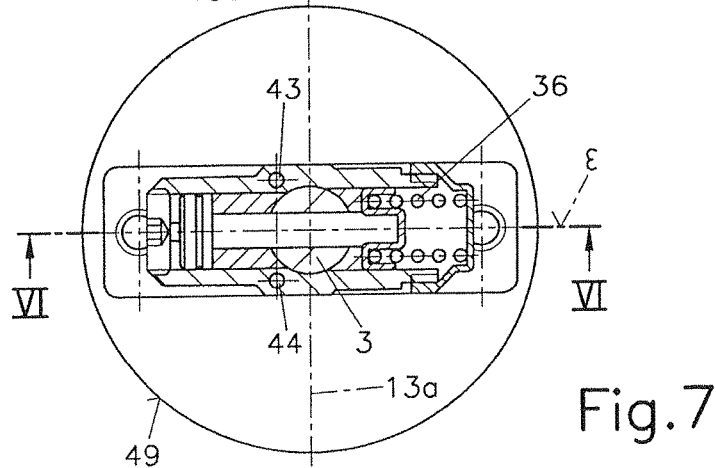
FIG. 7 shows this connecting rod in a sectional view along the line VII-VII in FIG. 6.

The position of the movable stop element 33 is chosen as high as possible beneath the piston (not shown) adjacent to the combustion chamber. The alignment of the axis 35a of the transverse borehole 35 can be at a right angle to the oscillating plane ϵ of the connecting rod 1, as shown in FIG. 1 to FIG. 5. This leads to a lower deflection of the stop element 33 than at a lower position and a different alignment of the axis 35a. In the event that the bottom edge of the piston skirt of a piston (not shown in closer detail) is situated above the movable stop element 33, the line 49 in FIG. 3, FIG. 6 and FIG. 7 represents the smallest possible cylinder bore. If the position of the movable stop element 33 is situated within the piston, the circle 49 in FIG. 3 represents the inner contour of the smallest possible piston. The oscillating plane ϵ shall be understood here as the plane which contains the longitudinal axis 1a of the connecting rod 1 and which extends normally to the axis 12a, 13a of the rod big-end and small-end 12, 13. The rod small-end 12 is used for connection to a piston (not shown in further detail) and the rod big-end 13 for connection to a crankshaft (not shown in closer detail).

Figure 8:
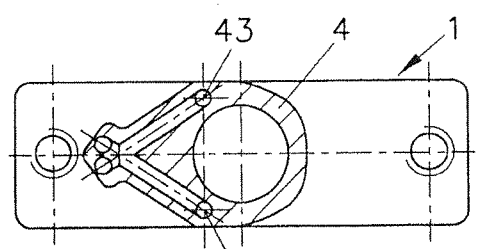
FIG. 8 shows this connecting rod in a sectional view along the line VIII-VIII in FIG. 6.
Figure 9:
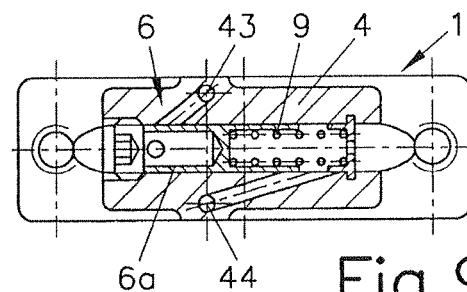
FIG. 9 shows this connecting rod in a sectional view along the line IX-IX in FIG. 6.

In some cases, e.g. short-stroke reciprocating engines with relatively large crank web radii, it can be advantageous to arrange the axis 35a of the transverse borehole 35 in the oscillating plane δ of the connecting rod 1, as shown in FIG. 6 to FIG. 9. As a result, the connecting rods can be arranged in a relatively slender way in the direction of the connecting rod eye axes. In order to keep the width of the connecting rod 1 in the deflection direction of the stop element 33 as small as possible, it can be advantageous to arrange the axial extension a of the wedge surface 37, 37a and the counter surface 39 lower (e.g. lower by at least ¼ or ⅓) than the thickness b of the piston element 3, both measured in the direction of the axis of the transverse borehole as shown in FIG. 6. The filling and discharge boreholes 43, 44 are arranged in this variant on both sides outside of the oscillating planes of the connecting rod 1 extending through the longitudinal axis is of the connecting rod 1, as shown in FIG. 8 and FIG. 9.

FIG. 10 and FIG. 11 shows a variant with a second embodiment for the control valve 6, which differs from the embodiment shown in FIG. 6 to FIG. 9 in such a way that the control valve 6 is arranged as a ball valve 60 with a valve ball 61 and a cylinder pin 63 which is axially displaceable in a receiving borehole 62 and which is displaceable together with the valve ball 61 by a restoring spring 64 to a first position and by oil pressure against the force of the restoring spring 64 to a second position. The first oil duct 10, which is formed by a pocket hole originating in the base of the high-pressure chamber 4b in which a stitch borehole to the receiving borehole 62 is situated, is located between the high-pressure chamber 4b and the receiving borehole 62. The stitch borehole opens into the receiving borehole 62 in which the axially displaceable cylinder pin 63 is arranged, which comprises a pin 65 at its end facing the valve ball 61 which acts on the valve ball 61. The receiving borehole 62 (and also the high-pressure chamber 4b via the first oil duct 10) is connected to the connecting-rod bearing 30 via a connecting opening 10a and borehole(s) 67 for the supply of motor oil.

In the case of low oil pressure, the restoring spring 64 presses the valve ball 61 and the cylinder pin 63 with the pin 65 against the intersection of the first oil duct 10 with the receiving borehole 62 for the cylinder pin 63 and seals the high-pressure chamber 4b beneath the piston element 3 (first position of the control valve 6). The piston element 3 is lifted by the inertial force and the valve ball 61 is lifted from the valve seat, as a result of which oil reaches the high-pressure chamber 4b. A limit stop 66 arranged in the first oil duct 10 prevents the valve ball 61 from leaving the oil duct 10 (second position of the control valve 6). When the oil pressure exceeds its switching value, the cylinder pin 63 is pressed to the right in FIG. 10 and FIG. 11, and the valve ball 61 releases the discharge opening 10a from the high-pressure chamber 4b. The high-pressure oil (which has approximately 20 times the combustion chamber pressure) reaches the filling borehole 43 via the boreholes 67 and from there to the pressure chamber 42 of the stop element 33, which is pressed to the right by this pressure and tightly holds the piston rod 3 of the rod part 2 in a frictionally engaged manner.

When the oil pressure is decreased, the restoring spring 64 expands and the valve ball 61 reaches the position where it seals the high-pressure chamber 4b. The rod part 2 plus the piston rod 3 is pulled upwardly during each second downward stroke and the valve ball 61 is lifted, as a result of which the high-pressure chamber 4b is filled with oil and a higher compression is obtained.

The invention claimed is:
1. A length-adjustable connecting rod for a reciprocating piston engine, comprising at least a first and a second rod part, which two rod parts can be pushed together and/or inside one another in a telescopic manner, wherein the second rod part forms a guide cylinder and the first rod part a piston element which is longitudinally displaceable in the guide cylinder, wherein a high-pressure chamber is spanned between the first and the second rod part, into which at least one first oil duct opens, wherein the two rod parts can be fixed by a locking device relative to one another in at least one position, wherein at least one valve is arranged in the first oil duct and the valve is a control valve, wherein at least one filling borehole can be controlled by an actuating piston of the control valve, and wherein the filling borehole is activated in a second position of the actuating piston and is closed in a first position of the actuating piston.

2. The connecting rod according to claim 1, wherein the two rod parts can be fixed by the locking device relative to one another in a position which corresponds to a minimum length of the connecting rod.

3. The connecting rod according to claim 1, wherein the locking device comprises a movable stop element which is displaceably arranged transversely to the longitudinal axis of the connecting rod in a transverse borehole of the piston element.

4. The connecting rod according to claim 3, wherein the movable stop element which is displaceably arranged against the force of a restoring spring.

5. The connecting rod according to claim 3, wherein the stop element comprises at least one wedge surface which is inclined with respect to a normal plane on the longitudinal axis of the connecting rod and which cooperates with a counter surface of the piston element.

6. The connecting rod according to claim 1, wherein the first oil duct is arranged as a feed and discharge channel.

7. The connecting rod according to claim 1, wherein a second oil duct arranged as a feed channel opens into the high-pressure chamber in which a non-return valve that opens in the direction of the high-pressure chamber is arranged.

8. The connecting rod according to claim 7, wherein the second oil duct originates from the receiving borehole of the control valve or from the oil supply channel.

9. The connecting rod according to claim 1, wherein the valve has a first position and a second position, wherein the first oil duct is closed in the first position and the first oil duct is open in the second position.

10. The connecting rod according to claim 1, wherein the valve is arranged as a ball valve with a valve ball and a cylinder pin which is axially displaceable in a receiving borehole and which is displaceable together with the valve ball to a first position by a restoring spring and to a second position by oil pressure against the force of the restoring spring.

11. The connecting rod according to claim 1, wherein the valve is arranged with an actuating piston which is axially displaceable in a receiving borehole and which is displaceable to a first position by a restoring spring and to a second position by oil pressure against the force of the restoring spring.

12. The connecting rod according to claim 11, wherein at least one discharge borehole can be controlled by the actuating piston of the valve, wherein the discharge borehole is activated in the first position of the actuating piston and closed in the second position of the actuating piston.

13. A length-adjustable connecting rod for a reciprocating piston engine, comprising at least a first and a second rod part, which two rod parts can be pushed together and/or inside one another in a telescopic manner, wherein the second rod part forms a guide cylinder and the first rod part a piston element which is longitudinally displaceable in the guide cylinder, wherein a high-pressure chamber is spanned between the first and the second rod part, into which at least one first oil duct opens, wherein the two rod parts can be fixed by a locking device relative to one another in at least one position, wherein the locking device comprises a movable stop element which is displaceably arranged transversely to a longitudinal axis of the connecting rod in a transverse borehole of the piston element, and wherein the stop element comprises at least one wedge surface which is inclined with respect to a normal plane on the longitudinal axis of the connecting rod and which cooperates with a counter surface of the piston element.

14. The connecting rod according to claim 13, wherein an axial extension of the wedge surface or at least a partial wedge surface and/or the counter surface is lower than the thickness of the piston element, both measured in the direction of the axis of the transverse borehole.

15. The connecting rod according to claim 13, wherein the axial extension of the wedge surface or at least a partial wedge surface and/or the counter surface is lower by at least ¼ than the thickness of the piston element, both measured in the direction of the axis of the transverse borehole.

16. The connecting rod according to claim 13, wherein the axial extension of the wedge surface or at least a partial wedge surface and/or the counter surface is lower by at least ⅓ than the thickness of the piston element, both measured in the direction of the axis of the transverse borehole.

17. The connecting rod according to claim 13, wherein the counter surface of the piston element is arranged in parallel to the wedge surface.

18. The connecting rod according to claim 13, wherein the wedge surface faces the high-pressure chamber.

19. The connecting rod according to claim 13, wherein the wedge surface is arranged in a divided manner, and comprises two partial wedge surfaces which are arranged in parallel to the counter surface and are arranged adjacent to one another in the direction of the axis of the transverse borehole, wherein a shoulder is formed between the two partial wedge surfaces.

20. The connecting rod according to claim 13, wherein the stop element comprises a stop piston which is displaceably mounted in a stop cylinder, or is connected thereto, wherein a pressure chamber is formed between the stop piston and the stop cylinder, which pressure chamber can be supplied with oil via at least one filling borehole.

21. The connecting rod according to claim 20, wherein the pressure chamber can be flow-connected to at least one discharge borehole.

22. The connecting rod according to claim 13, wherein the valve is arranged with an actuating piston which is axially displaceable in a receiving borehole and which is displaceable to a first position by a restoring spring and to a second position by oil pressure against the force of the restoring spring.

23. The connecting rod according to claim 22, wherein at least one discharge borehole can be controlled by the actuating piston of the valve, wherein the discharge borehole is activated in the first position of the actuating piston and closed in the second position of the actuating piston.

24. A length-adjustable connecting rod for a reciprocating piston engine, comprising at least a first and a second rod part, which two rod parts can be pushed together and/or inside one another in a telescopic manner, wherein the second rod part forms a guide cylinder and the first rod part a piston element which is longitudinally displaceable in the guide cylinder, wherein a high-pressure chamber is spanned between the first and the second rod part, into which at least one first oil duct opens, wherein the two rod parts can be fixed by a locking device relative to one another in at least one position, wherein at least one valve is arranged in the first oil duct, and wherein the valve is arranged with an actuating piston which is axially displaceable in a receiving borehole and which is displaceable to a first position by a restoring spring and to a second position by oil pressure against the force of the restoring spring.

25. The connecting rod according to claim 24, wherein the transverse borehole is arranged in an upper third of the connecting rod having a rod small-end.

26. The connecting rod according to claim 24, wherein the axis of the transverse borehole is arranged normally to an oscillating plane of the connecting rod.

27. The connecting rod according to claim 24, wherein the axis of the transverse borehole is arranged normally to a longitudinal axis of the connecting rod.

28. The connecting rod according to claim 24, wherein the axis of the transverse borehole is arranged in an oscillating plane of the connecting rod.

29. The connecting rod according to claim 28, wherein the axis of the transverse borehole is arranged normally to a longitudinal axis of the connecting rod.

30. The connecting rod according to claim 13, wherein at least one valve is arranged in the first oil duct.

31. The connecting rod according to claim 30, wherein the valve has a first position and a second position, wherein the first oil duct is closed in the first position and the first oil duct is open in the second position.

32. The connecting rod according to claim 30, wherein the valve is arranged as a ball valve with a valve ball and a cylinder pin which is axially displaceable in a receiving borehole and which is displaceable together with the valve ball to a first position by a restoring spring and to a second position by oil pressure against the force of the restoring spring.

33. The connecting rod according to claim 30, wherein the valve is arranged with an actuating piston which is axially displaceable in a receiving borehole and which is displaceable to a first position by a restoring spring and to a second position by oil pressure against the force of the restoring spring.

34. The connecting rod according to claim 30, wherein the valve is a control valve.

35. The connecting rod according to claim 34, wherein the control valve is arranged in the region of a connecting-rod bearing of the connecting rod.

36. The connecting rod according to claim 34, wherein at least one filling borehole can be controlled by the actuating piston of the control valve, wherein the filling borehole is activated in the second position of the actuating piston and is closed in the first position of the actuating piston.

37. The connecting rod according to claim 24, wherein an oil supply channel opens into the receiving borehole.

38. The connecting rod according to claim 37, wherein the oil supply channel is flow-connected to the connecting-rod bearing.

39. The connecting rod according to claim 37, wherein a throttling point is arranged in the oil supply channel.

40. The connecting rod according to claim 37, wherein the oil pressure level is lower in the first position of the cylinder pin or the actuating piston than in the second position of the cylinder pin or the actuating piston.

41. The connecting rod according to claim 24, wherein the receiving borehole is formed by a borehole transversely to the longitudinal axis of the connecting rod.

42. The connecting rod according to claim 24, wherein at least one discharge borehole can be controlled by the actuating piston of the valve, wherein the discharge borehole is activated in the first position of the actuating piston and closed in the second position of the actuating piston.

43. The connecting rod according to claim 24, wherein at least one valve is arranged in the first oil duct.

44. The connecting rod according to claim 43, wherein the valve is a control valve.

45. The connecting rod according to claim 44, wherein the control valve is arranged in the region of a connecting-rod bearing of the connecting rod.

46. The connecting rod according to claim 44, wherein at least one filling borehole can be controlled by the actuating piston of a control valve, wherein the filling borehole is activated in the second position of the actuating piston and is closed in the first position of the actuating piston.

47. The connecting rod according to claim 24, wherein the valve has a first position and a second position, wherein the first oil duct is closed in the first position and the first oil duct is open in the second position.

48. The connecting rod according to claim 24, wherein the valve is arranged as a ball valve with a valve ball and a cylinder pin which is axially displaceable in a receiving borehole and which is displaceable together with the valve ball to a first position by a restoring spring and to a second position by oil pressure against the force of the restoring spring.

* * * * *